Figure 7:
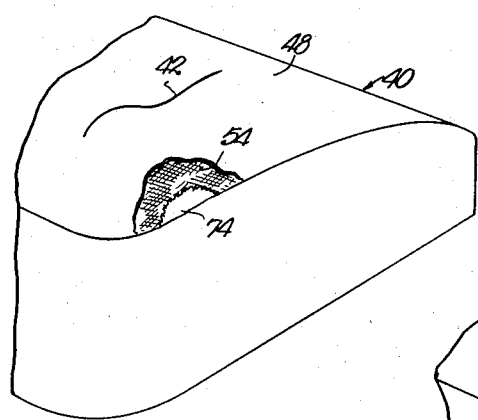

Oct. 7, 1958            T. F. MULKEY            2,855,338
METHOD OF MENDING VINYL PLASTIC UPHOLSTERED SEATS
Filed Oct. 21, 1955            2 Sheets–Sheet 1
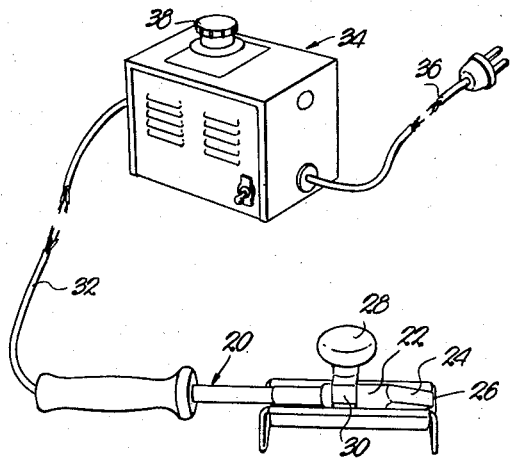
Fig. 1.
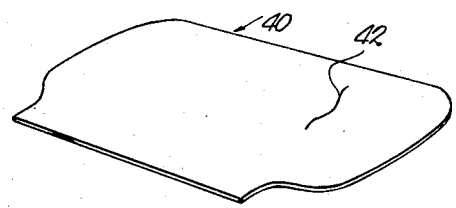
Fig. 2.
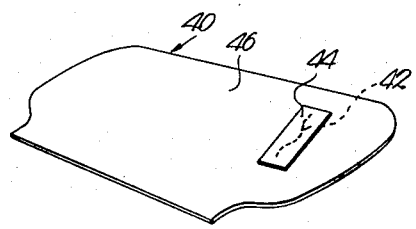
Fig. 3.
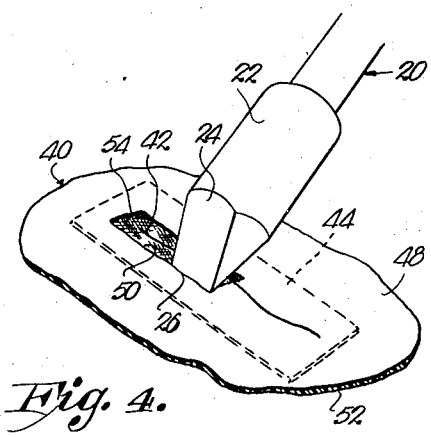
Fig. 4.
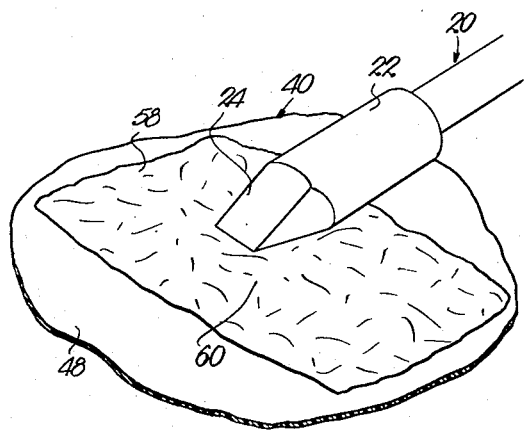
Fig. 6.
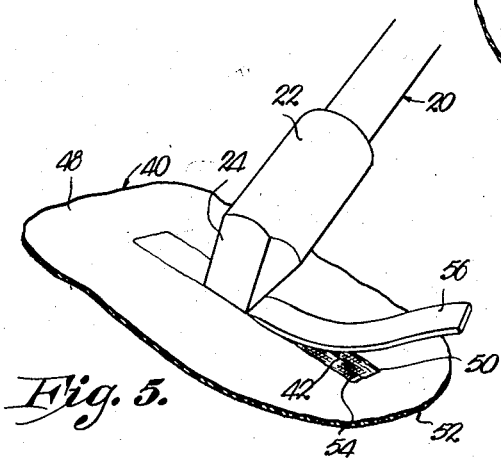
Fig. 5.
INVENTOR.
Troy F. Mulkey
BY
ATTORNEY.

Oct. 7, 1958   T. F. MULKEY   2,855,338
METHOD OF MENDING VINYL PLASTIC UPHOLSTERED SEATS
Filed Oct. 21, 1955   2 Sheets-Sheet 2

INVENTOR.
Troy F. Mulkey
BY
ATTORNEY.

United States Patent Office 2,855,338
Patented Oct. 7, 1958

2,855,338

METHOD OF MENDING VINYL PLASTIC UPHOLSTERED SEATS

Troy F. Mulkey, Independence, Mo.

Application October 21, 1955, Serial No. 541,919

4 Claims. (Cl. 154—104)

This is a continuation in part of my co-pending application Serial No. 302,978, filed August 6, 1952, and later abandoned, relating to "Method of Repairing Plastic Upholstery Materials."

Seats in public transit vehicles, theaters and the like are now commonly upholstered with covers formed of a relatively thin layer of vinyl resin plastic material bonded to a backing of cloth or the like. Such seat upholstering covers are subjected to a surprising amount of damage in the nature of cuts, gashes, rips or the like through ordinary wear and tear, vandalism and other causes. Conventionally, the repairing of such seat covers by previously existing methods is an extremely time consuming and labor consuming problem, particularly since most, if not all, of such prior methods require the complete removal of the cover from the seat before the repair can be effected. Even in instances where the repair might be made by prior methods with the cover still in place upon the seat, the mend effected is of questionable strength and objectionable appearance and requires the expenditure of an unnecessary amount of time.

Accordingly, it is the primary object of this invention to provide an improved process for mending cuts and the like in such seat covers which overcomes all of the above mentioned and other disadvantages of prior methods.

It is another important object of this invention to provide a method of repairing such covers which may be, if desired, conveniently performed without removal of the cover from the seat.

It is another important object of the invention to provide such a method wherein the complete repair can be effected by one familiar with the practice of the process at the rate of about one minute or less per inch of cut for the entire mending operation.

It is another important object of this invention to provide such a method which may be performed wholly by the use of simple and commonly available apparatus and materials and whose practice may be quickly taught to a workman not theretofore skilled in the upholstery art.

It is another important object of the invention to provide such a method whose practice provides a mend of strength as great as that of the original cover material and of appearance closely simulating that of the remainder of the cover so as to render the mend inconspicuous.

Still other important objects of the invention will be made clear or become apparent as the following description thereof progresses.

Figure 8:
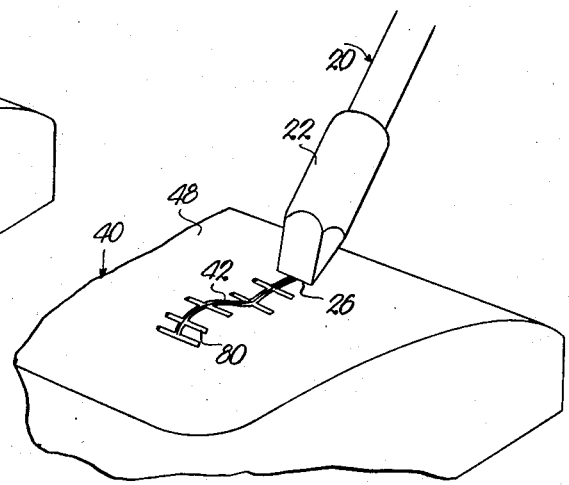
Figure 9:
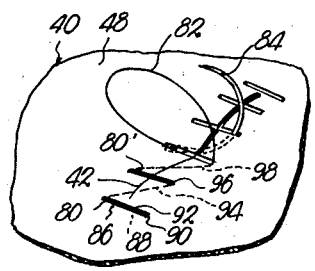
Figure 10:
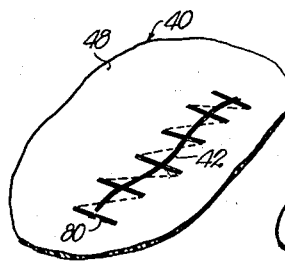
Figure 11:
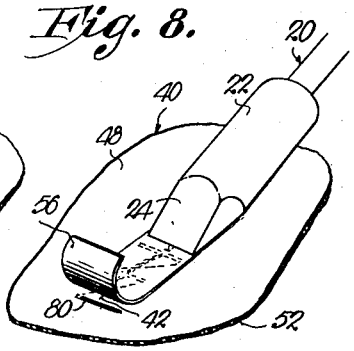
Figures 12, 13:
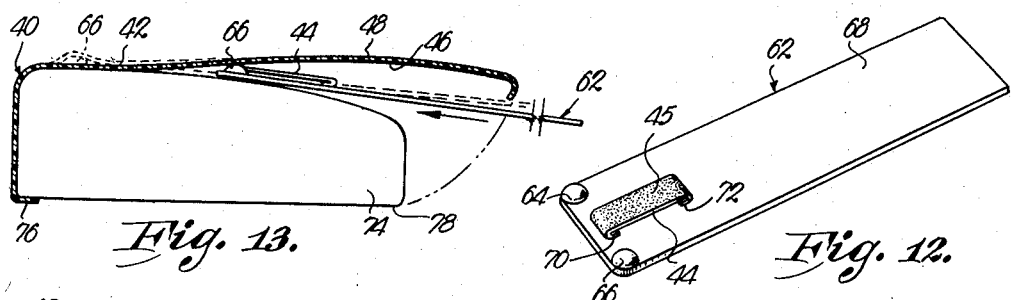
Figure 14:
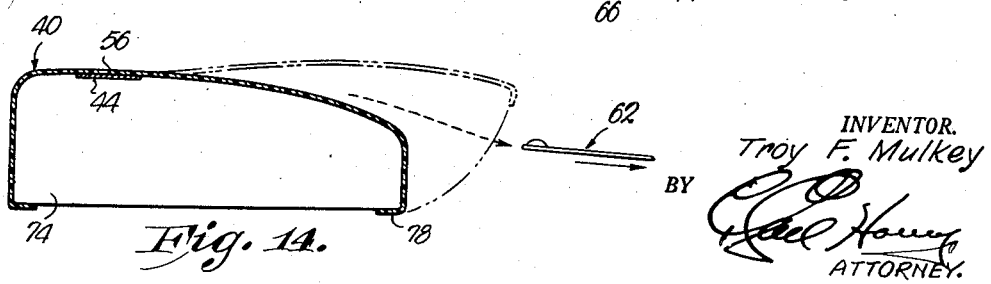

In the accompanying drawings:

Fig. 1 is a perspective view of apparatus such as may be used in practicing the method of the invention;

Figs. 2, 3, 4 and 5 illustrate various steps in one embodiment of the method wherein the cover to be repaired can be conveniently loosened or removed from the seat on which it is normally installed, Fig. 2 being a perspective view of the underside of a cover portion showing a cut therein, Fig. 3 being a perspective view similar to Fig. 2 but showing a piece of tape holding the margins of the cover adjacent the cut, Fig. 4 being an enlarged fragmentary perspective view of the normally exposed face of a portion of the cover adjacent the cut showing the formation of a groove surrounding the cut, and Fig. 5 being a perspective view similar to Fig. 4 showing the bonding of vinyl plastic mending material into the groove;

Fig. 6 is an enlarged, fragmentary, perspective view of the normally exposed face of a portion of the cover adjacent the partially mended cut showing the means for restoring the grain to the material with which the cut surrounding groove was filled;

Figs. 7, 8, 9, 10 and 11 illustrate various steps peculiar to the preferred embodiment of the invention, which does not necessitate removal of the cover from the seat, Fig. 7 being a fragmentary perspective view of a seat showing a cover thereon having a cut therein, Fig. 8 being a perspective view similar to Fig. 7 showing the formation of spaced, laterally extending grooves along the cut, Fig. 9 being a fragmentary, perspective view showing the stitching being applied to a portion of the cover adjacent the cut, Fig. 10 being a perspective view similar to Fig. 9 showing such portion of the cover after the stitching has been completed, and Fig. 11 being a perspective view similar to Figs. 9 and 10 showing the application of a mending strip of vinyl plastic material over the cut and stitching;

Fig. 12 is a perspective view which illustrates one form of apparatus suitable for applying a piece of adhesive tape to the underside of a cut; and Figs. 13 and 14 illustrate steps of the method by which a piece of adhesive tape may be applied to the underside of a cover adjacent a cut therein without complete removal of the cover from the seat, Fig. 13 being a view partially in elevation and partly in section showing the manipulations for the installation of the tape upon the cover, and Fig. 14 being a view similar to Fig. 13 showing the tape in place and the removal of the apparatus of Fig. 12 after completion of the mend.

In the practice of the method of this invention a heated tool is utilized and the temperature at which such tool is maintained is critical in view of the nature of the material of which the covers to be mended are formed and the materials used in the mending process. This invention relates particularly to the mending of covers formed at least in part of vinyl resin plastic material. The vinyl resins utilized in the manufacture of upholstery covers for public transit vehicle seats, theaters and the like, with whose repair this invention is particularly concerned, are in the great majority of cases of a kind such that the application thereto of a tool heated to less than about 320° F. and manipulated as contemplated by this invention will be ineffective to melt the material to a condition for easy working and satisfactory bonding, while the application of a tool heated to above about 360° F., even when so manipulated, will char the material. The best consistency of the melted vinyl plastic material for rapid working and effective bonding is when same is in a pasty, or putty-like, viscous state. Accordingly, it is to be understood that the practice of the method of this invention requires some apparatus for heating a satisfactory tool to, and maintaining the same at, a temperature within the critical range from 320° to 360° F., the preferred temperature having been found to be about 350° F.

Accordingly, and referring to the accompanying drawings, some apparatus including a tool and means for heating the same to the required temperature, such as is illustrtaed in Fig. 1, must be provided in connection with the practice of the invention. In Fig. 1 the numeral 20 generally designates an ordinary 250 watt soldering iron having a generally cylindrical head 22 provided with a tapered, flat, smooth surface 24 and a substantially linear edge 26, head 22 being electrically heated by means not shown. For convenience in utilizing the iron 20 in the practice of this invention, head 22 is preferably provided with a wooden handgrip 28 attached thereto by metallic clamping means 30. Iron 20 is provided with a power cord 32 which may be coupled with a voltage regulating device generally designated 34 and provided with a power cord 36 adapted for plugging into a power main or other suitable source of electrical current not shown. The device 34 is preferably provided with manually controllable adjustment means 38 by which the voltage delivered to the iron 20 may be controlled to, in turn, determine the temperature at which surface 24 and edge 26 of head 22 are maintained. A model V-O, "Varitran" variable transformer manufactured by the United Transformer Company of New York, New York, will be found satisfactory for use as device 34.

Broadly, the operations to be performed in practicing the method of this invention contemplate the provision of means for at least temporarily holding the adjacent edges of the cut together, the mending of the cut through application of vinyl resin plastic material in covering relationship thereto with same being bonded to the material of the cover through the employment of heat, pressure and manipulation, and the treatment of the mend formed by the added material to render the appearance of same similar to that of the remainder of the cover and, therefore, inconspicuous. The particular steps to be performed in accomplishing such more broadly mentioned operations will now be explained.

In one embodiment of the method, which is particularly illustrated in Figs. 2-6 inclusive, a cover 40 having an elongated cut or the like 42 therein is either removed from the seat (not shown) upon which it is normally installed or is unfastened from such seat sufficiently to permit application of a piece of adhesive tape 44 to the underside 46 of the cover 40 in covering relationship to the cut 42. Such tape 44 may be of any suitable nature sufficient to provide temporary holding action upon the marginal portions of cover 40 adjacent the cut 42 in such manner as to maintain the opposed edges of the cut 42 in abutting relationship while the subsequent steps of the mending process are performed.

The edge 26 of iron 20 is then brought in contact with the normally exposed face 48 of cover 40 adjacent the cut 42 to melt and substantially remove a portion of the vinyl plastic material adjacent the cut 42 to define a groove 50. Groove 50 extends along the cut 42 on both sides thereof and slightly beyond both ends thereof and reaches substantially through the vinyl plastic layer 52 of cover 40 to expose the cloth backing 54 of cover 40 adjacent the cut 42. It may be noted that this step can, and should, be performed by a relatively rapid, continuous movement of the head 22 of iron 20 with edge 26 remaining in contact with a given portion of layer 52 for not more than a very few seconds.

With the groove 50 thus formed in the vinyl plastic layer 52 of cover 40 adjacent the cut 42, a strip 56 of vinyl plastic material, and preferably of the same vinyl plastic as layer 52, is laid over the groove 50. Strip 56 should be of dimensions at least as large as groove 50, although it need not be of exactly the same size since any excess can, and will, be conveniently removed by severance through melting upon contact by the head 22 of iron 20. Obviously, the strip 56 should be of either clear vinyl resin material or of such material colored in the same manner as the layer 52 of cover 40, if the latter is colored. With the strip 56 in place over the groove 50, one of the opposed flat working surfaces 24 of head 22 is brought into contact with the strip 56 adjacent one extremity of the groove 50 and then moved continuously in the direction of the other extremity of groove 50 with slight pressure being applied to push the melted vinyl plastic material from strip 56 into the groove 50 and to effect a bond between such material and the backing 54 and edges of the layer 52 defining groove 50. Head 22 is then so moved back and forth along strip 56 until the latter and the underlying material of layer 52 are homogeneously bonded together and its exposed surface smoothed. The exact speed at which the iron surface 24 is to be moved along strip 56 will be quickly apparent to one trying the method as involving contact between the iron surface 24 and any given area of strip 56 of only the few seconds necessary to melt the vinyl plastic material from strip 56 to the desired workability. It may also be noted that the surface 24 during its progress along strip 56 preferably extends slightly onto the adjacent face 48 of layer 52, thereby effecting a renewed bond between the layer 52 and backing 54 adjacent the groove 50 as well as a better bond between the layer 52 and the new vinyl plastic material being bonded within the groove 50 from the strip 56. As already indicated, any excess material from the strip 56 may be severed by melting and then removed.

The steps of the method thus far described effect a strong mend of the cut 42 which, from a strictly performance viewpoint, constitutes a satisfactory repair. However, as a practical matter, the repairing of seats in public vehicles, theaters and the like further requires that the mend be rendered inconspicuous, since it has been found that an obvious mend either offends patrons or invites their examination of the mend in a manner that has been found to provoke tampering or vandalism requiring further repair. Since the vinyl plastic material bonded within groove 50 by the preceding steps of the method will be substantially smooth on its exposed surface, whereas the exposed surface 48 of layer 52 is normally textured or grained, it has been found desirable to similarly texture or grain the surface of the material added within groove 50 in the manner indicated by Fig. 6. To perform this last step of the process, a sheet of metallic foil 58 is crumpled or crushed within the hands to present an irregular pattern of wrinkles 60 therein and then unfolded and spread upon the surface 48 of cover 40 in covering relationship to the area of the mend effected by the addition of vinyl plastic material from strip 56 into groove 50. The flat surface 24 of iron 20 is then manipulated relatively rapidly and continuously across the foil 58 with slight pressure being applied. This serves to impress the pattern of the wrinkles 60 into the portion of upper surface 48 of cover 40 formed by the material added from strip 56, thereby texturing or graining the latter with surface depressions closely resembling the appearance of the remainder of cover surface 48. As thus described, the method could most conveniently be performed with the cover 40 removed from the seat upon which it is normally installed; however, the necessity for such removal is traceable directly to the step wherein the tape 44 is to be applied to the under surface 46 of cover 40. However, it has been found that by the use of the apparatus and steps illustrated in Figs. 12-14 inclusive, such complete removal of the cover 40 may be avoided.

The tape installing tool illustrated in Fig. 12 and generally designated by the numeral 62 comprises an elongated, metallic plate having a pair of rounded protuberances 64 and 66 in the corners of a major face 68 adjacent one end thereof. The tape 44 having an adhesive surface 45 is mounted upon the face 68 of tool 62 by means of bent over ends 70 and 72 of the strip 44 being temporarily held upon the tool 62 by means of the adhesive 45. It is noted that one end of the tape 44 is preferably emplaced substantially between the protuberances 64 and 66 with the other end spaced therefrom longitudinally of the tool 62.

In Fig. 13 the cover 40 is more or less permanently attached to the seat 74 by means normally disposed as at 76 and 78. For a cut 42 located as illustrated atop the seat 74, the fastening means for cover 40 may be loosened only at 78 and only along a sufficient part of the cover 40 to permit insertion of the tool 62 as illustrated in solid lines in Fig. 13. It will be noted that during insertion of the tool 62, the same is preferably maintained at an angle with the overlying cover 40 such that the protuberances 64 and 66 will keep cover 40 out of contact with tape 44 until the latter underlies the cut 42. When the tool 62 has been advanced to a point where tape 44 does underlie cut 42 the outermost end of tool 62 may be swung toward the position indicated in dotted lines to bring the tape 44 into contact with the under surface 46 of cover 40. Thereupon, the cover 40 may be pressed down by pressure applied to cover surface 48 adjacent the cut 42 onto and into adhesive relationship with the upturned portion of tape 44. The tool 62 may then be longitudinally reciprocated a short distance in each direction to unwind the bends 70 and 72 respectively for adhesive joindure with the under surface 46 of cover 40. The tape 44 then serves to hold the portions of cover 40 adjacent cut 42 as above described.

The remainder of the steps of the method heretofore explained may then be performed while the tool 62 is left in underlying relationship to the cut 42 and tape 44 for purposes of rigidity and, after completion of the mend, can be withdrawn as indicated in Fig. 14. The cover 40 may then be refastened to the seat 74 as at 78 to complete the repair.

In many cases, however, it is desired to effect a repair of the cover 40 without any removal or detachment of same from the seat upon which it is installed. Accordingly, the preferred embodiment of the method of the invention involves the steps illustrated in Figs. 7–11 inclusive for the accomplishment of such objective. It should be significant to note that the performance of the entire repair operation by such preferred method involves the expenditure by an ordinarily skilled workman of less than one minute per inch of cut to be repaired.

In such preferred embodiment of the invention the first step is to momentarily bring the edge 26 of heated head 22 of iron 20 successively into contact with the exposed surface 48 of cover 40 at intervals spaced along the length of cut 42 and, by the application of slight pressure, to melt away the vinyl plastic material from layer 52 presenting a row of spaced grooves 80 traversing the cut 42 and extending laterally in both directions therefrom. Such grooves 80 preferably commence just beyond one end of the cut 42 and terminate just beyond the other end thereof, it being understood that they extend substantially through the layer 52 to expose the underlying portion of backing 54.

A flexible filament or thread 82 is then passed or stitched by an ordinary upholsterer's overcast type stitch effected with a curved needle 84 through the cover 40 to pull and hold the portions of cover 40 adjacent the cut 42 together. In order that stitches of the filament 82 will not protrude above the exposed surface 48 of cover 40, the stitching is commenced by passing the filament downwardly through the backing 54 as at 86 adjacent one end of an end groove 80, thence under the cover 40 as at 88 and back up through the backing 54 as at 90 within said groove 80 adjacent the opposite end thereof, thence along the exposed side of backing 54 as at 92 within said groove 80 and downwardly through the cover 40. It is then passed diagonally as at 94 under the cover 40 and across the cut 42 and back outwardly through the cover 40 as at 96 within the adjacent groove 80′, thence along the groove 80′ and downwardly through cover 40, thence again diagonally as at 98 to the next adjacent groove, etc. As filament 82 is thus stitched into cover 40 same is pulled tight to draw the opposed edges of cut 42 together into abutting engagement.

With the cut 42 thus held by the filament 82 a strip 56 of vinyl resin plastic material of dimensions large enough to cover the entire cut 42 and all of the grooves 80 is emplaced upon the exposed surface 48 of cover 40 in covering relationship to such cut 42, grooves 80 and filament 82 within grooves 80. One of the flat surfaces 24 of heated head 22 of iron 20 is then moved continuously from one end of strip 56 to the other at a rate sufficiently slow to melt the vinyl plastic material from strip 56 into tightly bonded relationship with the same material of layer 52 adjacent the cut 42 and the grooves 80, slight pressure being applied to the head 22 to force the melted material into grooves 80. Head 22 is then so moved back and forth along strip 56 until the latter and the underlying material of layer 52 are homogenously bonded together and its exposed surface smoothed. As above explained, any excess of the strip 56 may be severed and removed by melting with the iron 20.

The above-mentioned steps of the preferred method effect the mechanical joindure or mending of the cut 42. The material from strip 56 deposited upon the layer 52 in order to effect the mechanical mend may then be grained or textured in the same manner as above described in connection with Fig. 6.

It will now be obvious that the method contemplated by this invention is ideally adapted for accomplishing all of the above-mentioned and other objectives of the invention. Particularly with respect to the preferred embodiment described, it will be manifest that great savings of time and labor are effected. It will further be apparent that such objectives are attained by carrying out the process under the critical conditions described, since the use of lower temperatures or more rapid manipulations will fail to effect a satisfactory bond, while the use of higher temperatures or slower manipulations will cause charring of the vinyl plastic material being treated, the secret of satisfactory, practical mending of the subject materials having been found to reside in the utilization of a body heated to a predetermined temperature and manipulated continuously at a predetermined rate with the area of contact between the body and the material being treated at any one instance being relatively small.

It should also be observed, however, that the embodiments described for purposes of illustration could be varied in some respects without departing from the true spirit and intention of the invention. Accordingly, it is to be understood that the invention shall be deemed limited only by the scope of the appended claims.

Having thus described the invention, what is claimed as new and desired to be secured by Letters Patent is:

1. The method of mending an elongated cut in a seat upholstering cover formed of a layer of vinyl resin plastic material having a normally exposed face and an undersurface bonded to a cloth backing which comprises the steps of at least temporarily forcing and holding opposed portions of the backing adjacent the cut together to move the opposed parts of the layer defined by the cut into substantially abutting relationship; heating a body having a substantially linear edge to raise and maintain the temperature of the edge above the melting temperature of said material; bringing said edge into contact with said face of the layer adjacent the cut, then applying pressure to and manipulating said edge while said portions of the backing are still so held and said edge is so heated until a groove extending substantially through the thickness of the layer to expose the backing therebeneath and extending to both sides of the cut is formed in the cover; emplacing a piece of vinyl resin plastic material upon the cover in covering relationship to said groove; heating a body having a substantially smooth and flat surface to raise and maintain the temperature of the surface above the melting temperature of said material; and bringing said surface into contact with said piece, then applying pressure to and manipulating said surface while said portions of the backing are still so held, said surface is so heated and said piece is so disposed until at least a portion of the piece has been melted and flowed into the groove and been bonded onto both said parts of the layer and that part of the backing exposed by the groove in covering relationship to the cut and the groove.

2. In the method as set forth in claim 1, wherein said groove formed by manipulation of said edge extends beyond the cut both longitudinally and laterally of the latter.

3. In the method as set forth in claim 1, wherein said groove formed by manipulation of said edge is one of a plurality thereof, each of which is elongated and has its length disposed in transversely bridging relationship to the cut intermediate the ends of the latter.

4. In the method as set forth in claim 3, wherein said holding of opposed portions of the backing is accomplished by tightly looping a filament to parts of the backing exposed by the groove and on opposite sides of the cut with that stretch of said filament on the side of the backing proximate said face of the cover being disposed entirely within said groove.

References Cited in the file of this patent
UNITED STATES PATENTS

| | | |
|---|---|---|
| 1,475,029 | Risk | Nov. 20, 1923 |
| 2,304,852 | Sharples | Dec. 15, 1942 |
| 2,421,096 | Vogt | May 27, 1947 |
| 2,428,716 | McGill et al. | Oct. 7, 1947 |
| 2,430,076 | Pollock | Nov. 4, 1947 |
| 2,442,405 | Fornwalt | June 1, 1948 |
| 2,446,771 | Knowland | Aug. 10, 1948 |
| 2,631,947 | Kline et al. | Mar. 117, 1953 |

OTHER REFERENCES

"Lucite" Manual, pp. 74 to 78; November 1942, published by E. I. Du Pont de Nemours & Co. (Inc.), Arlington, New Jersey.